Figure 1:
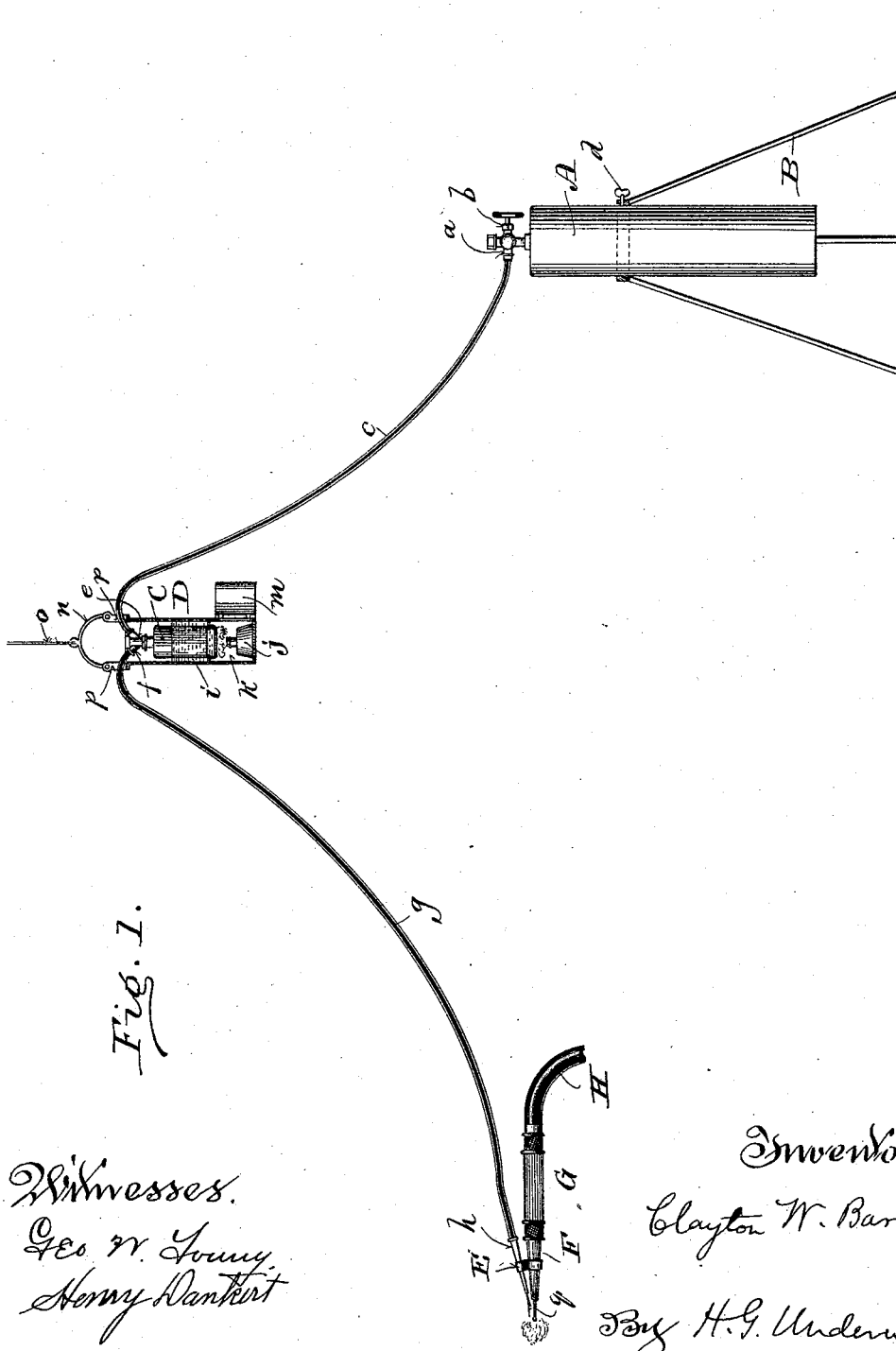

(No Model.) 2 Sheets—Sheet 1.

C. W. BARNEY.
DENTAL APPLIANCE.

No. 536,007. Patented Mar. 19, 1895.

Witnesses.
Geo. W. Young.
Henry Dankert.

Inventor
Clayton W. Barney
By H. G. Underwood
Attorneys.

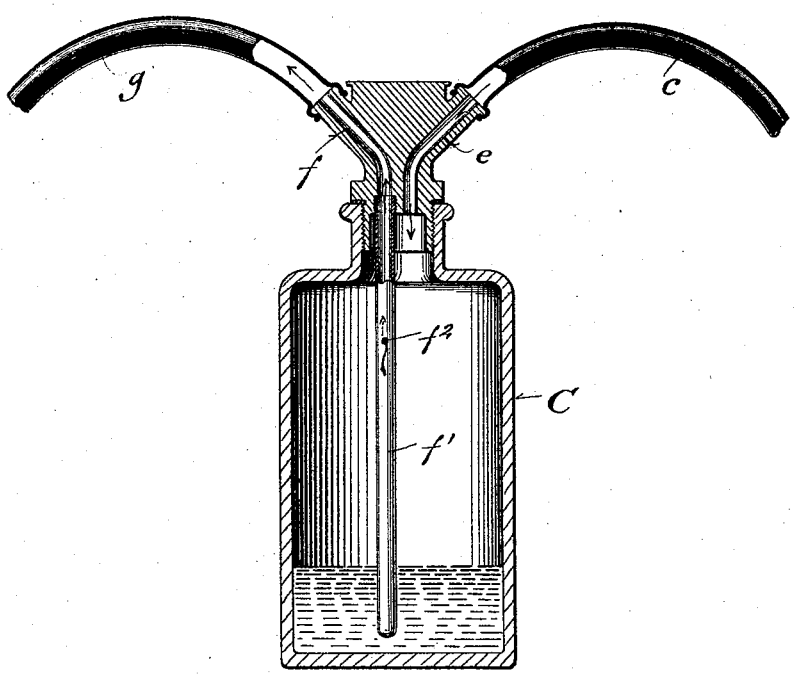

UNITED STATES PATENT OFFICE.

CLAYTON W. BARNEY, OF HARTFORD, WISCONSIN.

DENTAL APPLIANCE.

SPECIFICATION forming part of Letters Patent No. 536,007, dated March 19, 1895.

Application filed April 28, 1894. Serial No. 509,301. (No model.)

*To all whom it may concern:*

Be it known that I, CLAYTON W. BARNEY, a citizen of the United States, and a resident of Hartford, in the county of Washington, and in the State of Wisconsin, have invented certain new and useful Improvements in Dentistry and Dental Appliances; and I do hereby declare that the following is a full, clear, and exact description thereof.

My invention relates to dental appliances, and consists in the construction and arrangement of certain apparatus to facilitate and effect the process of operating upon teeth painlessly, all as will be more fully set forth hereinafter and subsequently claimed.

In the drawings: Figure 1 is a general view showing the construction and arrangement of apparatus designed to embody and carry out my said invention, the parts thereof being mainly represented in side elevation, but portions being shown in section to better illustrate details of construction. Fig. 2 is a central vertical sectional view through an atomizing vessel, forming a part of my said invention.

Referring to said drawings, A represents a cylinder, designed, in this instance, to hold nitrous oxide gas, and having an outlet, $a$, at the top, controlled by a suitable cock or valve, $b$, and communicating with a preferably flexible tube $c$, leading to a vessel C, hereinafter described. The cylinder A is preferably supported on a tripod B, or other suitable framework or support, for greater convenience and portability, and is shown as adjustably connected thereto, by set-screw $d$.

The vessel C, hereinbefore referred to, is preferably in the form of a flask or bottle, whose mouth is provided with a double-apertured stopper, made preferably of hard rubber, and formed with two apertures therethrough, $e$ and $f$, the outer end of the aperture $e$ communicating with the before named flexible tube $c$, and the outer end of the aperture $f$ communicating with a like flexible tube $g$, the latter terminating, at its free outer end, in a nozzle $h$. The described double-apertured stopper forms an atomizer head, and in the illustration given, in Fig. 2, the lower end of the described aperture $f$ communicates with a tube $f'$, closed at the bottom and having an opening $f^2$ near the top of the flask C, the lower end of the aperture $e$ opening within the upper part of the said flask, as shown, this forming a very simple and efficient atomizing device.

The vessel C is designed to contain any suitable anæsthetic solution, and is shown supported, and partly immersed, in a water-bath $i$, which forms part of the supporting device D, the walls of which are shown in section to disclose a heating device $j$ (in this instance, an alcohol lamp) beneath the bottom of the water-bath, said lamp being herein shown as supported in a suitable chamber, $k$, in the lower part of the said supporting device D, said chamber having a door $m$, and said supporting device being itself preferably suspended, as illustrated, by the bail $n$ and suspension cord, wire, chain, or other device, $o$. The bail $n$ is secured or connected to forked or perforated ears or lugs, $p, p$, whose openings or apertures afford a convenient passage and guide-way to the inner ends of the described flexible tubes $c, g$.

E represents a double loop or link, connected to, or having its upper part slipped upon, the described nozzle $h$, while the lower part of said loop or link is designed to receive the holder or shank F of any suitable dental tool, $q$, the hand piece G of a dental engine, with the usual flexible shaft H of said engine connected thereto, being illustrated in the present drawings, but the particular tool employed being immaterial, as the device is designed to be used with dental-drills, files, hammers, pluggers, chisels, polishers, and other usual appliances whose use ordinarily occasions pain to the person being operated upon.

The operation of my invention will be apparent from the foregoing description of its construction and arrangement, taken in connection with the accompanying drawings, which represent the use of my invention, while preparing a cavity for filling. The anæsthetic solution in the vessel C is heated, as indicated, and as the cock or valve $b$ of the clyinder A is opened, a spray of this solution, mixed with nitrous oxide gas is thrown, through flexible tube $g$ and its nozzle $h$ directly upon the tooth being operated upon, at the precise point being drilled, cleaned, or otherwise treated, whereby all pain from the operation is obviated. It will be understood that the said solution in the vessel C need not necessarily be heated, or, if it is of such a nature as to render this desirable, said vessel can be held, supported, or suspended, over a gas-jet, lighted lamp-burner or other flame, as may be most convenient, without departing from the spirit of my invention, but as shown in the drawings, the arrangement and construction illustrated make a very complete and convenient device, especially for use in an office not supplied with any convenient or accessible means for heating the solution in the vessel C when necessary.

Having thus described my invention, what I claim as new, and desire to secure by Letters Patent, is—

1. A dental appliance, comprising a gas-holding cylinder, a vessel for containing an anæsthetic solution, and provided with an atomizing device, a valve-controlled pipe or tube connecting said cylinder and said vessel, and another pipe or tube leading from said atomizing device and terminating in a nozzle for directing a spray of said solution, and a dental tool supported adjacent to said nozzle, so that in operation said tool and the spray from said nozzle may simultaneously strike exactly the same place in the tooth being treated.

2. A dental appliance, comprising a gas-holding clyinder, a vessel for containing an anæsthetic solution and provided with an atomizing device, a valve-controlled flexible pipe or tube connecting said cylinder with said atomizing device, a frame for supporting said vessel provided with a water bath, a heating device supported by said frame beneath said water-bath, a flexible pipe or tube leading from said atomizing device and terminating in a nozzle, and a supporting device attached to said nozzle for receiving a dental tool and supporting the same adjacent to the nozzle.

In testimony that I claim the foregoing I have hereunto set my hand, at Hartford, in the county of Washington and State of Wisconsin, in the presence of two witnesses.

CLAYTON W. BARNEY.

Witnesses:
J. M. LE COUNT,
WM. RUDKE.